Figure 5:
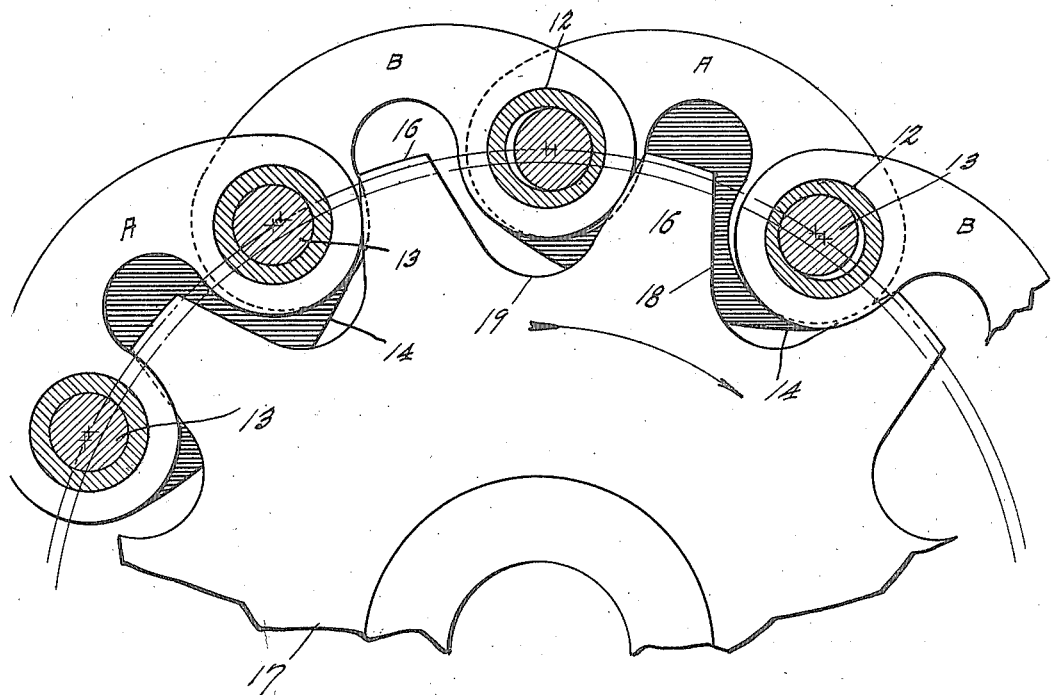

A. B. TAYLOR.
CHAIN.
APPLICATION FILED OCT. 15, 1917.
1,270,460.
Patented June 25, 1918.
2 SHEETS—SHEET 1.
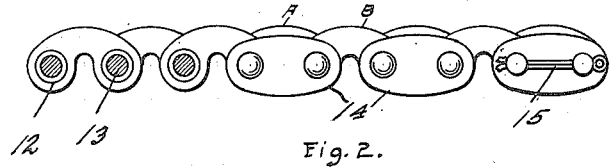
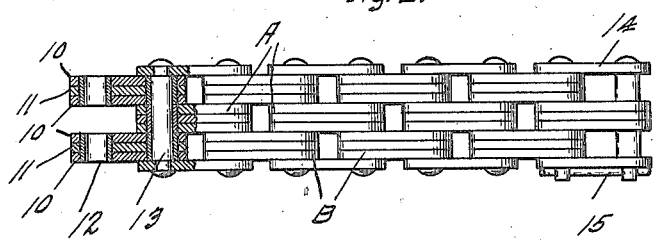
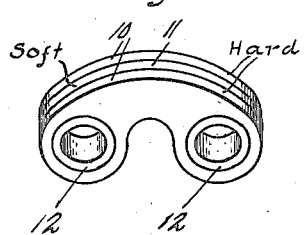
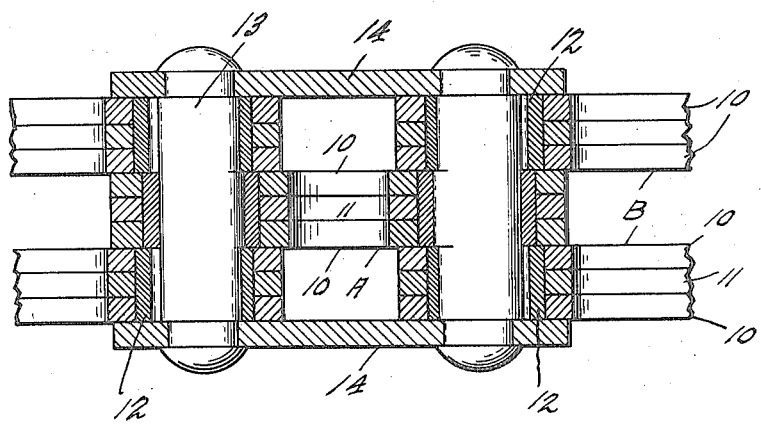
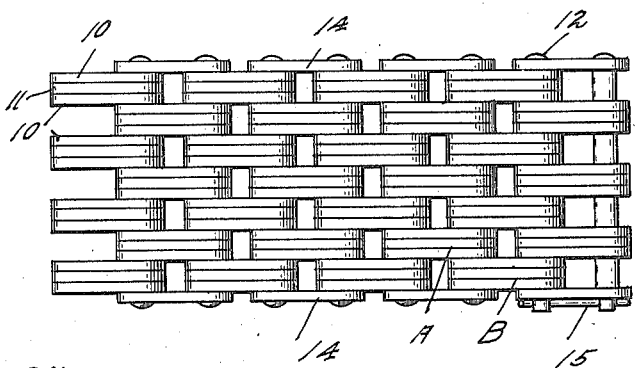
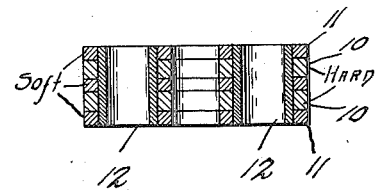
Inventor
Arthur B. Taylor,
By Hood & Schley
Attorneys
Witness
Frank A. Fahle

A. B. TAYLOR.
CHAIN.
APPLICATION FILED OCT. 15, 1917.

1,270,460.

Patented June 25, 1918.
2 SHEETS—SHEET 2.

Witness
Frank A. Fahle

Inventor
Arthur B. Taylor,
By
Hood & Achly.
Attorneys

UNITED STATES PATENT OFFICE.

ARTHUR B. TAYLOR, OF DETROIT, MICHIGAN.

CHAIN.

1,270,460.   Specification of Letters Patent.   Patented June 25, 1918.

Application filed October 15, 1917. Serial No. 196,599.

*To all whom it may concern:*

Be it known that I, ARTHUR B. TAYLOR, a citizen of the United States, residing at Detroit, in the county of Wayne and State of Michigan, have invented a new and useful Chain, of which the following is a specification.

It is the object of my invention to produce a drive chain, and a coöperating sprocket, which will operate practically noiselessly, both when the chain is new and after it is worn; which can be made of links produced by punching without any machining; which operates with a minimum of wear; and which while exceedingly resistant to wear is not brittle and has great tensile strength.

I have found that by making the chain links composite, of alternate hard and soft metal laminæ, I obtain great tensile strength and marked absence of brittleness, together with great wear-resisting qualities; and at the same time a great reduction in the noise of operation. These complete links are U-shaped and provided with round ends, so that they may extend over a sprocket tooth into the notches on both sides thereof, and the sprocket teeth are provided with plane faces where they are engaged by the round ends of the links which are astride them. By such plane faces and by having the notches between the teeth of sufficient depth, the ends of the links do not seat in the bottoms of such notches. The laminæ of each composite link are united into a single link by bushings in the pivot holes, between which bushings and the laminæ there is no relative motion and consequently no wear; and these composite links with their bushings are then mounted on pivot pins to form a chain of links in staggered arrangement, the pins being arranged so that they are fixed with relation to one set of alternate links but move relatively to the other set of alternate links as the chain articulates, so that all the wear at joints occurs between such pins and the bushings of this second set of alternate links. By this arrangement of wearing surfaces, and by the wear which takes place on the rounded ends of the composite links and the teeth of the sprocket, I have found that I obtain a substantial compensation in wear, so that the pitch of the chain still corresponds to the pitch of the sprockets and the parts coöperate noiselessly even when material wear has occurred, the points of engagement of the links with the sprocket teeth moving slightly outward radially as such wear occurs.

Figure 4:
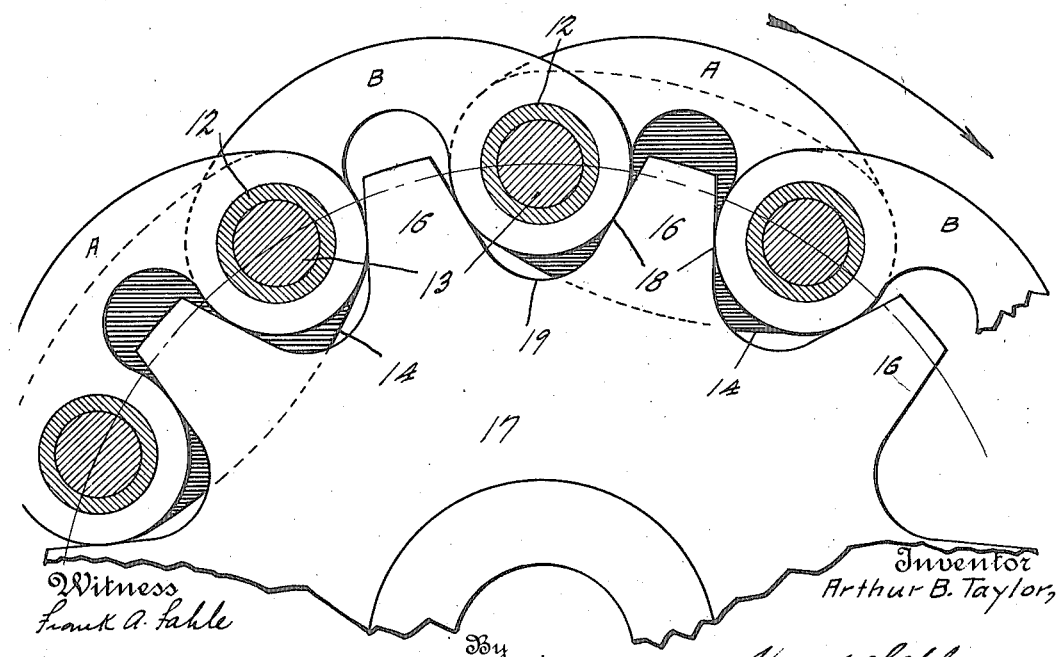

The accompanying drawings illustrate my invention. Figure 1 is an elevation of a chain embodying my invention, with some of the parts broken away; Fig. 2 is a plan of such chain, with some of the links in section; Fig. 3 is a perspective view of one of the composite links; Fig. 4 is an enlarged partial elevation of a fragment of my improved chain and the coöperating sprocket, some of the parts being broken away on different planes, showing the coöperation of the different link ends with the sprocket teeth in a new chain; Fig. 5 is a view similar to Fig. 4, showing (in great exaggeration) the effect of wear; Fig. 6 is a development section through the pivot pins and the points of engagement of the chain links with the sprocket teeth to indicate the effect of wear, such effect being exaggerated many times in order to make it apparent on the drawing; Fig. 7 is a section through a link formed of a greater number of laminæ than that of Fig. 2; and Fig. 8 is a plan view of a chain, somewhat similar to Fig. 2, but with a greater number of links in the width of the chain.

Each chain link is a composite link, comprising a plurality of laminæ of the same size and shape, but with laminæ 10 of hard metal alternating with laminæ 11 of soft metal. I prefer to use steel for both the hard and the soft metal. Preferably the arrangement of hard and soft metal laminæ is symmetrical about the middle plane of the composite link, so as to obtain symmetry in the action of the link in its various phases, such as wear, tensile strength, brittleness, etc.; and the link may be made up of any number of laminæ. In the form shown in Figs. 2 and 3, each link has three laminæ, with a single soft metal lamina 11 between two hard metal laminæ 10; while in the form shown in Fig. 7 the link has five laminæ, of which the two outside laminæ are soft, hard and soft laminæ alternating through the link. Thus the outside laminæ may be of either hard or soft metal. In both Fig. 2 and Fig. 7 the symmetry of the arrangement is preserved, by reason of the odd number of laminæ and the alternate arrangement of hard and soft laminæ. The hard and soft laminæ may be of either the same or different thicknesses, as illustrated in Figs. 3 and 7 respectively.

The composite link thus made has great wear-resisting qualities because of the hard laminæ used. It is prevented from being brittle because of the soft laminæ used, which soft laminæ take whatever jars the chain is subjected to and preserve the hard laminæ from breakage. In addition, the soft laminæ serve to give great tensile strength.

Moreover, this composite link of hard and soft laminæ operates with almost complete silence. This silence is most surprising, and I have not been able to discover a fully satisfactory explanation for it, but it actually exists, as I have determined from some very extensive experiments. It exists very noticeably in links of the ordinary silent chain type, where the link ends are pointed, with plane surfaces for engaging the faces of the sprocket teeth; but it is even more marked when the links are provided with rounded ends, especially when such rounded ends coöperate with plane-faced sprocket teeth by engagement with the faces of the teeth of which they are astride and without seating in the bottom of the notches between the sprocket teeth, in the manner which forms part of the present invention and will be explained hereinafter.

The laminæ forming the links are perforated at their ends to receive pivot bushings 12, which project entirely through all the laminæ of each composite link and are flush with the side faces of such links, as is clear from Figs. 2 and 7. The composite links are arranged in a staggered manner, as is usual in silent chains, and as is clear from Figs. 2 and 8, with the links A alternating both longitudinally and transversely with the links B and overlapping thereupon with their bushings 12 registering; and pivot pins 13 are passed through the registering bushings 12 of the overlapping ends of the links A and B and through side plates 14 which correspond in longitudinal location with the links A and serve to hold the chain on the sprocket. The pivot pins 13 are suitably fastened in place, as by rivet heads or by cotter pins 15, so that they do not turn relatively to the side plates 14 and the links A. Thus all wear in the joints occurs between the pivot pins 13 and the bushings 12 of the links B, none occurring between the pivot pins 13 and the bushings 12 of the links A or between the bushings 12 of any links and the laminæ which are joined together by such bushings. This is indicated in Figs. 5 and 6, though in order to show the wear the amount thereof in these figures is many times exaggerated over what it would actually be in practice. These links A and B are preferably exactly similar in size and construction, for facility in manufacturing. There may be any number of links A and B crosswise of the chain, as indicated in Figs. 2 and 7, there being always one more link B in the width of the chain than there are links A, and the chain being symmetrical about the medial longitudinal line of the chain, on which line always lies a row of links A when the side plates 14 are used to hold the chain on the sprocket.

The links and the individual laminæ which form them are U-shaped, as clear from Figs. 1 and 3, so that each link projects over a tooth 16 of a coöperating sprocket 17 into the notches on both sides of such tooth, and engages the faces of the tooth of which it is astride. Where they engage the sprocket teeth, the ends of the links are rounded in substantially arc shape with the axes of articulation as the centers, but at such points of engagement the sprocket teeth 16 themselves are provided with plane surfaces 18 oblique to the radii, which project convergently below the points of tangency with the link ends and are joined by curves 19 of any desired character so long as such curves clear the link ends, as is clear from Fig. 4, so that the link ends can not seat in the bottoms of the notches. The plane surfaces 18 on both sides of the teeth 16 are engaged by link ends, and preferably each face 18 is engaged by the ends of both links A and links B, when the chain is new; though when the chain has been worn materially any link end engages but one such face 18, of the tooth having which face such link is astride, and through which face the pull is transmitted.

I have found that with this construction I am able to get a chain which is practically silent in operation, which can be made inexpensively of unmachined punchings, has great tensile strength, which is not easily broken, and which has a long working life. The link ends enter the notches of the sprocket with practically no friction therewith, engaging the sprocket teeth with substantially no sliding. As wear occurs between the pins 13 and the bushings 12 of the links B, there is a compensating wear between the link ends of both links A and B and the plane faces 18 of the sprocket teeth, and the link ends coöperate with the sprocket teeth at a slowly increasing radial distance on the teeth.

I claim as my invention:

1. A chain composed of a plurality of composite U-shaped links comprising alternate hard and soft metal laminæ, said links being in a staggered relation with their ends overlapping and pivotally interconnected and each composite link having its hard and soft laminæ symmetrically arranged with respect to the medial plane of the link.

2. A chain composed of a plurality of composite U-shaped links comprising alternate hard and soft metal laminæ, said links being in a staggered relation with their ends overlapping and pivotally interconnected, and said chain as a whole being symmetrical with respect to the longitudinal medial plane of the chain.

3. A chain composed of a plurality of composite U-shaped links comprising alternate hard and soft metal laminæ, said links being in a staggered relation with their ends overlapping and pivotally interconnected.

4. A chain composed of a plurality of composite U-shaped links comprising interspersed hard and soft metal laminæ, said links being in a staggered relation with their ends overlapping and pivotally interconnected.

5. A chain composed of a plurality of composite U-shaped links comprising interspersed hard and soft metal laminæ, said links being in a staggered relation with their ends overlapping and pivotally interconnected and each composite link having its hard and soft laminæ symmetrically arranged with respect to the medial plane of the link.

6. A chain composed of a plurality of composite U-shaped links comprising interspersed hard and soft metal laminæ, said links being in a staggered relation with their ends overlapping and pivotally interconnected, the laminæ forming each link all being of substantially the same size and shape.

7. A chain composed of a plurality of composite U-shaped links comprising interspersed hard and soft metal laminæ, said links being in a staggered relation with their ends overlapping and pivotally interconnected, said links having rounded working faces at their ends for engagement with the sprocket teeth.

8. A chain composed of a plurality of composite U-shaped links comprising interspersed hard and soft metal laminæ, said links being in a staggered relation with their ends overlapping and pivotally interconnected, said links having rounded working faces at their ends for engagement with the sprocket teeth, and a sprocket the teeth of which have plane faces oblique to the radii for coöperating with the rounded ends of said links.

9. A chain composed of a plurality of composite U-shaped links comprising interspersed hard and soft metal laminæ, said links being in a staggered relation with their ends overlapping and pivotally interconnected, said links having rounded working faces at their ends for engagement with the sprocket teeth, and a sprocket the teeth of which have plane faces oblique to the radii for coöperating with the rounded ends of said links, the adjacent plane faces of two adjacent teeth being joined by a surface which clears the coöperating link end so that such link end does not seat in the bottom of the notch formed between such two teeth.

10. A chain composed of a plurality of U-shaped links in a staggered relation with their ends overlapping and pivotally interconnected, said links having rounded working faces at their ends for engagement with the sprocket teeth of which they are astride, and a sprocket the teeth of which have plane faces oblique to the radii and engaged by rounded ends of the links which are astride such teeth.

11. A chain composed of a plurality of U-shaped links in a staggered relation with their ends overlapping and pivotally interconnected, said links having rounded working faces at their ends for engagement with the sprocket teeth of which they are astride, and a sprocket the teeth of which have plane faces oblique to the radii and engaged by rounded ends of the links which are astride such teeth, the adjacent plane faces of two adjacent teeth being joined by a surface which clears the coöperating link end so that such link end does not seat in the bottom of the notch formed between such two teeth.

12. A chain composed of a plurality of composite U-shaped links comprising interspersed hard and soft metal laminæ, said links being in a staggered relation with their ends overlapping and pivotally interconnected, a pivot bushing mounted in each end of each link and uniting the laminæ thereof, the ends of said bushing being substantially flush with the side faces of said link, and pivot pins projecting through the bushings of overlapping links.

13. A chain composed of a plurality of composite U-shaped links comprising interspersed hard and soft metal laminæ, said links being in a staggered relation with their ends overlapping and pivotally interconnected, a pivot bushing mounted in each end of each link and uniting the laminæ thereof, and pivot pins projecting through the bushings of overlapping links.

14. A chain composed of a plurality of composite U-shaped links comprising interspersed hard and soft metal laminæ, said links being in a staggered relation with their ends overlapping and pivotally interconnected, a pivot bushing mounted in each end of each link and uniting the laminæ thereof, and pivot pins projecting through the bushings of overlapping links, each pivot pin being rigid against turning with relation to alternate ones of those links of which it forms the pivotal interconnection so that all the wear is between such pin and the bushings of the other links.

15. A chain composed of a plurality of

U-shaped links in a staggered relation with their ends overlapping and pivotally interconnected, and pivot pins projecting through overlapping links, each pivot pin being rigid against turning with relation to alternate ones of those links of which it forms the pivotal interconnection so that all the wear is between such pin and the other links, said links having rounded working faces at their ends for engagement with the sprocket teeth of which they are astride, and a sprocket the teeth of which have plane faces oblique to the radii and engaged by rounded ends of the links which are astride such teeth.

16. A chain composed of a plurality of composite U-shaped links comprising interspersed hard and soft metal laminæ, said links being in a staggered relation with their ends overlapping and pivotally interconnected, said links having rounded working faces at their ends for engagement with the sprocket teeth of which they are astride, and a sprocket the teeth of which have plane faces oblique to the radii and engaged by rounded ends of the links which are astride such teeth.

In witness whereof, I have hereunto set my hand at Indianapolis, Indiana, this 12th day of October, A. D. one thousand nine hundred and seventeen.

ARTHUR B. TAYLOR.